(12) United States Patent
Hawrylko et al.

(10) Patent No.: US 7,238,739 B2
(45) Date of Patent: Jul. 3, 2007

(54) USE OF CALCIUM CARBONATE IN RIGID POLY(VINYL CHLORIDE) COMPOSITIONS

(75) Inventors: Roman B. Hawrylko, Avon Lake, OH (US); Peter W. Krause, Grand Valley (CA); Michel Levesque, Beauharnois (CA)

(73) Assignee: PolyOne Corporation, Avon Lake, OH (US)

( * ) Notice: Subject to any disclaimer, the term of this patent is extended or adjusted under 35 U.S.C. 154(b) by 356 days.

(21) Appl. No.: 10/506,661

(22) PCT Filed: Mar. 13, 2003

(86) PCT No.: PCT/US03/07490

§ 371 (c)(1),
(2), (4) Date: Sep. 3, 2004

(87) PCT Pub. No.: WO03/078520

PCT Pub. Date: Sep. 25, 2003

(65) Prior Publication Data

US 2005/0131123 A1    Jun. 16, 2005

(51) Int. Cl.
*C08L 1/00*    (2006.01)

(52) U.S. Cl. .............. 524/425; 524/180; 524/269; 524/515; 524/567

(58) Field of Classification Search ............... 524/425, 524/567, 515, 269, 180
See application file for complete search history.

(56) References Cited

U.S. PATENT DOCUMENTS

| | | | |
|---|---|---|---|
| 3,476,627 A | 11/1969 | Squires .................. | 18/13 |
| 4,213,487 A | 7/1980 | Funk et al. ............. | 138/149 |
| 4,711,921 A * | 12/1987 | Lehr ..................... | 524/180 |
| 4,977,193 A * | 12/1990 | Croce et al. ............ | 521/85 |
| 5,100,946 A * | 3/1992 | Hung et al. ............. | 524/397 |
| 5,102,465 A * | 4/1992 | Lamond .................. | 106/465 |
| 5,880,177 A * | 3/1999 | Higgs et al. ............ | 523/217 |
| 5,948,492 A * | 9/1999 | Cargile ................. | 428/36.4 |

FOREIGN PATENT DOCUMENTS

GB    1564087    4/1980

OTHER PUBLICATIONS

Derwent Abstract for JP 03 195754A (1991).
Derwent Abstract for JP 08 188652A (1996).
J. of Vinyl Technology, vol. 5, No. 3, pp. 91-95 (1983).

* cited by examiner

*Primary Examiner*—David W. Wu
*Assistant Examiner*—Henry S. Hu
(74) *Attorney, Agent, or Firm*—John H. Hornickel

(57) ABSTRACT

Poly(vinyl chloride) is compounded with a chalk-like, essentially pure calcium carbonate to provide improved weathering resistance of rigid poly(vinyl chloride) articles subjected to external exposures of heat and sunlight. Blends and alloys are also disclosed. Optionally, one can add either zinc alkyl ester scavenger, organotin stabilizer, or both to further improve the effectiveness of the essentially pure calcium carbonate.

20 Claims, No Drawings

USE OF CALCIUM CARBONATE IN RIGID POLY(VINYL CHLORIDE) COMPOSITIONS

FIELD OF THE INVENTION

This invention pertains to rigid poly(vinyl chloride) (abbreviated herein as "PVC") and the use of calcium carbonate therein.

BACKGROUND OF THE INVENTION

Rigid PVCs contain little or no plasticizer and are commonly used in a wide variety of internal uses sheltered from direct outside environmental exposure. Rigid PVCs are known to degrade upon exposure to sunlight, heat and UV, which degrades the polymeric structure of PVCs and generates trapped HCl acid.

Stabilizers are known to reduce the adverse weathering effects of exposure to heat and sun and frequently are added to PVCs used externally.

Calcium carbonates are commonly used as filler materials in PVCs, but are not known to provide weather resistance or resistance to polymeric degradation upon exposure to heat and sunlight.

Caribbean calcium carbonates described as micritic chalk-like, marine based and sedimentary in origin are disclosed in U.S. Pat. No. 5,102,465 for use as filler material in polyester molding compounds.

SUMMARY OF THE INVENTION

It now has been found that certain chalk-like calcium carbonates are especially useful in rigid PVCs. Surprisingly, alone or together with conventional scavengers, these chalk-like calcium carbonates function as a scavenger for free HCl acid generated in PVCs upon exposure to visible and ultraviolet light.

"Chalk-like calcium carbonate" for this invention is essentially pure calcium carbonate.

"Essentially pure calcium carbonate" means a purity of the calcium carbonate is at least 95 weight percent, preferably at least 98 weight percent, and most preferably at least 99 weight percent.

Non-limiting examples of essentially pure calcium carbonate include Caribbean micritic calcium carbonates derived from soft friable marine fossil sedimentary deposits and any other calcium carbonate in the form of chalk mined in any other location in the world wherein the purity of the calcium carbonate is at least 95 weight percent.

One aspect of the present invention is a weather resistant poly(vinyl chloride) compound, comprising poly(vinyl chloride) and at least about 2 weight parts of essentially pure chalk-like calcium carbonate per 100 weight parts of poly(vinyl chloride), the calcium carbonate having a particle size less than about 10 μm.

A second aspect of this invention is the poly(vinyl chloride) compound of the present invention, blended with a poly(acrylic) acid or acid ester.

Optionally, the poly(vinyl chloride) compound also includes at least about 0.1 weight parts of a lower alkyl ester of zinc scavenger, preferably a dialkyl ester of zinc, and at least about 0.5 weight parts of an organotin heat stabilizer, preferably a dibutyl tin mercaptide, both weight parts based on 100 weight parts of the poly(vinyl chloride).

Features and advantages of the invention are described in connection with the embodiments thereof.

EMBODIMENTS OF THE INVENTION

Essentially Pure Calcium Carbonate

Chalk deposits exist in various parts of the world, where once shallow seas were teeming with animal life. Any chalk deposit accessible to modern mining techniques is a candidate for use in the present invention, if the chalk is essentially pure.

Caribbean Calcium Carbonate

Caribbean calcium carbonates are mined from soft and friable, finely divided, chalk-lines marine sedimentary deposits frequently occurring as surface deposits in the Caribbean area. Caribbean calcium carbonates are high purity, finely divided, fine particle size friable deposits described as Caribbean micritic limestone in U.S. Pat. No. 5,102,465, the disclosure of which is incorporated by reference herein.

These chalk deposits are sedimentary in origin, comprising a combination of reef limestone deposits of reef fossil fragments, betrital deposits of fibrous skeletal and non-skeletal grains, micrite deposits of naturally formed precipitated calcium carbonate in beds or matrix with betrital, and chalk deposits of disarticulated caccolith fragments. Caribbean micritic calcium carbonates are soft and friable, chalk-like consistency, sedimentary deposits comprising reefs, betritals, micrite and chalky deposits.

Caribbean calcium carbonate deposits tend to agglomerate in the natural sedimentary state but can be readily broken down or commutated to produce rounded porous particles. Useful Caribbean calcium carbonates have a particle size less than about 10 μm, desirably about 6 μm or less, preferably having a typical particle size distribution of about 70% less than about 3 μm, where particles from about 1 to about 3 μm or lower are most preferred. Smaller particles increase the surface area, which in turn increases the scavenger effectiveness against PVC degradation.

Caribbean micritic calcium carbonates are found throughout the Caribbean basin with significant deposits found in Haiti and Jamaica. Caribbean micritic calcium carbonates, especially of Jamaican origin, are very high in purity typically exhibiting above 98% and typically more than about 99% pure calcium carbonate, with minimal amounts of impurities.

Both wet ground and dry ground Caribbean calcium carbonates are effective for eliminating free HCl acid generation in PVCs, although wet ground is preferred and has been found to be more effective. Chemically processed precipitated Caribbean micritic calcium carbonates are effective HCl scavengers and similarly prevent PVC degradation in accordance with this invention.

Jamaican micritic calcium carbonate is preferred and characteristically contains high purity calcium carbonate, typically more than about 99% by weight pure calcium carbonate, and commonly mined from surface sedimentary chalky marine deposits of friable fragile agglomerated particles. The deposits can be subsequently wet or dry ground by grinding for instance by a hammer mill followed by ball mill grinding to obtain the small particle size.

Useful Jamaican micritic calcium carbonates can be obtained directly by grinding without using a chemical precipitation processing commonly used in the U.S. with U.S. limestone and marble deposits. U.S. deposits also typically contain perceptible levels of iron which can promote discoloration and degradation of PVCs. In contrast, Caribbean and Jamaican micritic calcium carbonates are free of measurable amounts of iron. Preferred Jamaican calcium carbonate particles are approximately 6 µm or less in particle size. At about 6 µm or below, the ground calcium carbonate particles are hydrophobic and become more effective with decreasing particle sizes. Most preferred particle sizes are about 3 µm or below for protecting rigid PVCs in accordance with this invention, while particles less than about 1.5 µm are best.

Purity of the ground particles of Jamaican micritic calcium carbonate particles on a weight basis ordinarily is above about 99%, typically above about 99.3% pure calcium carbonate, essentially free of iron (that is less than about 0.5% or less than about 0.2%, or nil), and with minimal impurities of less than about 1.0% or about 0.4% magnesium carbonate, less than about 0.1% crystalline silicates, and less than about 0.3%, acid insolubles, if any.

Preferred useful commercial Jamaican calcium carbonates are Optifil™, Optifil JS™, and Optifil T™ calcium carbonates supplied by J. B. Huber Co. and described as 99% pure, virtually free of crystalline silica and other impurities such as magnesium carbonate and silicates, and free of other metals such as iron. Optfil JS calcium carbonate is surface treated with stearate. Published physical properties of Optifil and Optifil T calcium carbonates from Jamaica are as follows.

TABLE 1

Reported Optifil ™ Calcium Carbonate Physical Properties

| | |
|---|---|
| Grind (Hegman) | 6 µm |
| Oil absorption | 17% (w/w) (Optifil) |
| | 16% (w/w) (Optifil T) |
| Moisture | 0.2% |
| Specific surface area | 3.45 m$^2$/gm |
| Calcium carbonate | 99% |
| Magnesium carbonate | 0.4% |
| Crystalline silica | 0.1% maximum |
| Silicates | 0.2% maximum |

In accordance with this invention, at least about 2 weights parts of Caribbean calcium carbonate, advantageously between about 2 and about 50 weight parts, and preferably between about 5 and about 15 weight parts are compounded with 100 weight parts of rigid PVC resin to obtain desired effective results of using Caribbean calcium carbonate in this invention. Higher levels and smaller particles of Caribbean calcium carbonate provide increased effectiveness as an HCl scavenger.

While the purity of Caribbean calcium carbonate is presently known and commercially available, other chalk-like calcium carbonates that meet the requirement of essential purity identified above are also acceptable according to the present invention.

Optional Additives

Optionally and in a preferred aspect of this invention, essentially pure calcium carbonate is utilized in conjunction with an organotin heat stabilizer to further enhance the effective resistance to HCl acid generation in PVCs.

Useful organotin stabilizers are mono-, di-, or tri-substituted alkyl or alkyl esters of tin known as alkyltins, where the remaining valences of the alkyltins are activated mono-, di-, or tri-substituted active mercapto groups (mercaptoacids and their esters, or mercaptides), or active carboxylic acids and their esters known as carboxylates (e.g. maleic or lauric acids, or maleic esters or half esters) such as dibutyl tin carboxylates. Active mercapto tin compounds ordinarily are referred to as thiotins, while active carboxylic acid or esters of tin are known as carboxylates.

Organotins are excellent heat stabilizers and considerably enhance the short and long-term stability of PVCs containing essentially pure calcium carbonate in accordance with this invention. The effectiveness of the organotins is primarily influenced by the non-alkyl activated mono-, di-, or tri-substituted mercapto groups or carboxylate groups, where thiotins and especially dialkythiotins are preferred. Preferred alkyltin stabilizers contain reactive mercapto ligands substitutions in thioglycolates (mercaptide) and/or reverse mercaptide esters. Preferred stabilizers are metallic tin salts of organic acid comprising tin dialkyl ester mercaptides.

Useful organotin mercaptide ester stabilizers comprise alkyl tins including methyl tins, butyl tins, reverse ester tins, octyl tins, and tin corboxylates, where dibutyl tin mercaptides are preferred, and the most preferred is dibutyl tin ethyl hexyl mercaptoacetate. A commercially preferred organotin stabilizer is Thermolite T-31 sold by Atochem and described as dibutyl tin ethyl hexyl mercaptoacetate. The organotin stabilizers effectively prevent or counteract HCl generated in PVCs by heat and sunlight exposure and avoid degradation of PVC polymers.

Organotin stabilizers are believed to deactivate labile chlorine atoms in the PVC chain by replacement by the ligand groups of the stabilizer, and/or bind HCl evolved in incipient degradation, and/or reaction with double bonds of polyene sequences, and/or scavenging of free radicals, and/or decomposition of peroxide groups forming due to PVC decomposition. At least about 0.5 weight part, desirably from about 0.5 to about 3 weight parts, and preferably from about 1 to about 1.5 or about 2 weight parts of organotin stabilizer are used with 100 weight parts PVC resin.

In a useful aspect of this invention, essentially pure micritic calcium carbonate is utilized in conjunction with an organotin stabilizer and optionally in combination with limited amounts of a zinc alkyl ester and preferably a zinc dialkyl ester scavenger. Useful organic scavengers comprise dialkyl organic esters of zinc comprising zinc metal reacted with a lower aliphatic alkyl mono-caroxylic acid having from about 4 to about 12 carbon atoms, preferably a lower fatty acid having from about 6 to about 10 carbon atoms, where about 7 to about 9 carbon atoms are most preferred.

Useful preferred alkyl ester groups include hexyl, septyl, octyl, nonyl, and decyl esters, where the dialkyl ester groups can be the same or different alkyl chains. The most preferred alkyl is octyl and zinc octoate is the most preferred. A useful commercial zinc octoate is L 230 sold by Baerlocher U.S.A. located in Dover, Ohio. A useful zinc monoester is zinc benzoate. Zinc alkyl esters interact with the organotin compound to prevent PVC degradation but surprisingly do not form zinc chloride, a known PVC destabilizer, provided the equivalents of zinc do not exceed the active equivalents of non-alkyl mercapto or carboxylate components in the organotin stabilizer. The limited levels of zinc dialkyl ester combined with excess organotin increase the effectiveness of the essentially pure micritic calcium carbonate to provide considerable weather and degradation resistance in accordance with this invention. The zinc dialkyl ester scavenger is limited relative to the amount of organotin in that the non-alkyl active ligand comprising mercapto or carboxylate groups exceed the equivalent alkyl content in the zinc dialkyl ester. A deficiency of mercapto or carboxylate equivalent relative to excess zinc has been found to generate free zinc and will cause detrimental zinc deterioration of PVC and formation of undesirable zinc chloride. Conversely, excess equivalents of mercapto or carboxylate groups available to complex with lesser equivalents of zinc avoids free zinc and avoids zinc deterioration of poly(vinyl chloride).

With higher substituted organotins, such as tri-functional mecapto groups, the ratio of tin to zinc can be as low as 0.75 to about 1, while di-functional substituted active groups, such as di-mercapto groups, the equivalent tin to zinc ratio is from about 10 to about 5.0, where the preferred ratio is from about 1.5 to 3. Similarly, mono-substituted mercapto organotins will be higher to provide sufficient mercapto groups to complex with less zinc dialkyl ester. Excess organotin equivalents relative to deficient zinc ester equivalents have been found to increase the overall efficiency for precluding and avoiding PVC degradation. On a weight basis, PVC resin is compounded with zinc dialkyl ester scavenger at a level above about 0.1 weight part, usefully from about 0.1 to about 3 weight parts or more depending on the active non-alkyl active ligand group in the organotin, preferably from about 0.1 to about 2 weight parts, where the most preferred levels are from about 0.5 to about 1 weight parts, based on 100 weight parts of PVC resin.

Other supplementary additional stabilizers can be added if desired. Other useful stabilizers include alkaline materials such as magnesium oxide or barium oxide or sodium silicate for providing weather resistance. Useful heat stabilizers include alkaline hydroxides, hydroxide carbonates, amines, sodium silicate, and barium cadmium soaps. Particularly useful heat stabilizers include epoxidized soybean oil, phosphites, zeolites, hydrotalcites, Marc C® and Hydramax® (magnesium carbonate and calcium carbonate). To obtain maximum effectiveness, a mixture of stabilizers can be used where one stabilizer may be effective against heat while another may be effective against sunlight.

Particularly useful UV light-stabilizers include organic UV screeners and organic antioxidants such as hindered amines, benzotriazoles, benzophenanes and Uvinil N-35 light-stabilizer. The foregoing stabilizers can be used in conjunction with the organotin stabilizer, if desired. Another useful stabilizer is a calcium zinc compound where calcium forms harmless calcium chloride and avoids formation of detrimental zinc chloride.

Poly(vinyl chloride) Resins

Rigid PVCs utilized in this invention comprise PVC being essentially a homopolymer with minimal amounts of less than about 5% by weight copolymerized other vinyl comonomer, but preferably little or no copolymerized other vinyl monomer. Commercial PVC ordinarily comprises about 56% by weight chlorine and has a Tg of about 81° C. Poly (vinyl chloride) comprises polymerized vinyl chloride monomer where preferred PVC polymers are essentially homopolymerized vinyl chloride with little or no copolymerized other vinyl co-monomers.

Preferred PVCs are essentially homopolymers of polymerized vinyl chloride. Useful vinyl co-monomers if desired include vinyl acetate, vinyl alcohol, vinyl acetals, vinyl ethers, and vinylidene chloride. Other useful co-monomers comprise mono-ethylenically unsaturated monomers and include acrylics such as lower alkyl acrylates or methacrylates, acrylic and methacrylic acids, lower alkyl olefins, vinyl aromatics such as styrene and styrene derivatives, and vinyl esters. Useful commercial co-monomers include acrylonitrile, 2-hexyl acrylate, and vinylidene chloride. Although co-monomers are not preferred, useful PVC copolymers can contain from about 0.1% to about 5% by weight copolymerized co-monomer, if desired.

Preferred PVCs are suspension polymerized vinyl chloride monomer, although mass (bulk) polymerized polymers can be useful, but are less preferred. Rigid PVCs contain little or no plasticizer, and, if present, ordinarily less than about 5 weight parts placticizer per 100 weight parts of PVCs. The PVCs of this invention have an inherent viscosity from about 0.45 to about 1.5, preferably from about 0.5 to about 1.2, as measured by ASTM D 1243 using 0.2 grams of resin in a 100 ml of cyclohexanone at 30° C.

A correlation of molecular weights of rigid PVC resins with inherent viscosity and intrinsic viscosity is as follows:

TABLE 2

PVC Physical Properties Correlation

| Inherent viscosity cyclohexanone 2 gm/100 mL 30° C. | Intrinsic viscosity 1% cyclohexanone | Weight Average molecular weight × 10E−3 | Number Average molecular weight × 10E−3 |
|---|---|---|---|
| 0.52 | 1.60 | 40.0 | 20.0 |
| 0.68 | 1.82 | 56.0 | 28.0 |
| 0.78 | 1.96 | 67.0 | 33.0 |
| 0.92 | 2.19 | 82.5 | 41.0 |
| 1.02 | 2.37 | 94.0 | 46.5 |
| 1.12 | 2.55 | 106.3 | 51.7 |
| 1.40 | 3.10 | 141.0 | 68.5 |

Essentially pure chalk-like Caribbean calcium carbonate was found to provide considerable weathering resistance, in addition to contributing an inexpensive source of filler material to the compounding of the rigid PVCs.

It has been further found that a combination of limited amounts of a lower alkyl acid ester of zinc scavenger, especially zinc octoate, and an organotin acid stabilizer together provide improved degradation resistance in combination with the essentially pure calcium carbonate, which collectively provide considerably improved degradation resistance when subjected to hot and sunny exposures.

The essentially pure calcium carbonate surprisingly exhibits HCl scavenger properties and contributes to neutralization or absorption of HCl to eliminate HCl acid evolving upon heat and sunlight exposure degradation. The essentially pure calcium carbonate is an effective scavenger by itself, but is more effective in conjunction with low levels of zinc alkyl ester scavenger and organotin stabilizer, where the HCl scavenger effectiveness is increased with increased levels of essentially pure calcium carbonate. Low levels of zinc alkyl ester likewise function as an HCl scavenger without degrading the polymeric structure of PVCs to provide weathering resistance, eliminates any sulfur generated by tin mercaptide stabilizers, and surprisingly does not adversely interact with the organotin stabilizer.

In accordance with this invention, poly(vinyl chloride) compounds of the present invention can be extruded or molded to be used for articles exposed to hot and sunny environments, particularly in climates closer to the Equator where the environment is especially punishing to poly(vinyl chloride)-containing products.

Articles made with poly(vinyl chloride) compounds of the present invention exhibit substantially improved resistance to acid generation, acid degradation, discoloration, cracking and other weathering physical deterioration of PVCs due to excessive heat and sun exposure. Enhanced color retention and stability can be achieved with white pigmented PVCs, along with pastels and medium depth pigmented colors, as well as with darker colors.

Blends and Alloys

In a desirable aspect of this invention, PVC resins described above can be alloyed or blended with poly (acrylic) polymers to form useful acrylic-modified rigid PVC useful for extrusion or molding resins in accordance with this invention.

Poly(acrylic) polymers are polymerized acrylic monomers comprising acrylic and methacrylic esters, acids, and other addition polymerizable derivatives of acrylic acid. Acrylic monomers include lower alkyl esters of acrylic and methacrylic acids containing from 1 to about 12 alkyl carbon atoms as well as aromatic derivatives of acrylic and methacrylic acids. Useful acrylic monomers include, for example, methyl, ethyl, butyl, propyl, 2-ethyl hexyl, cyclohexyl, decyl, isodecyl, benzyl esters of acrylic or methacrylic acid, as well as hydroxyl alkyl acrylates and methacrylates such as hydroxyethyl and hydroxypropyl acrylate or methacrylate, and acrylic acids such as acrylic acid, methacrylic acid, and ethacrylic acid. Particularly useful acrylic monomers include acrylic acid, methyl acrylate, ethyl acrylate, n-butyl acrylate, isobutyl acrylate, 2-ethylhexyl acrylate, methacrylic acid, methyl methacrylate, ethyl methacrylate, n-butyl methacrylate, lauryl methacrylate, 2-hydoxyethyl methacrylate, hydroxypropyl methacrylate, 2-dimethylaminoethyl methacrylate, and 2-t-butylaminoethyl methacrylate.

Useful polyacrylate alloying polymers can be a homopolymer but preferably a copolymer of two or more acrylic monomers where hard monomers and soft monomers are copolymerized to provide a copolymer. Useful polyacrylic polymers for alloying with PVC resins do not appreciably plasticize the PVC and preferably have a glass transition temperature ("Tg") approximating the Tg of rigid PVC to provide a rigid PVC extrusion or molding resin alloy. Useful Tgs for polyacrylate alloying polymers are desirably above about 70° C., and preferably from about 75° C. to about 105° C. as measured by the Fox equation. Useful high Tg monomers include for instance methyl methacrylate (105° C.), isopropyl methacrylate (81° C.), tert-butyl methacrylate (107° C.), acrylic acid (106° C.), and methacrylic acid (185° C.), where high Tg acrylic monomers can be copolymerized with minor amounts of lower Tg acrylic monomers for monomers to provide a non-plasticizing Tg polyacrylic alloying polymer.

Useful commercial polymers are Acrylicgard CS-102™ (Rohm & Haas), Solarkotel™ (Atofina), and Kaneka™ as XCP. Minor amounts of other ethylenically unsaturated monomer can be copolymerized with acrylic monomers, but are not preferred. The preferred polyacrylic alloying polymers are polymethacrylate and polymethacrylate copolymers where polymethyl methacrylate is the most preferred alloying polymer.

The PVC alloy can comprise by weight from about 25% to about 75% polyacrylate alloying polymer. Such PVC alloys are particularly useful as cap stock for rigid PVC disclosed in U.S. Pat. No. 4,100,325, which is fully incorporated herein by reference.

Other Optional Ingredients

In compounding the rigid PVCs, other compounding components are desirably incorporated into the PVC resins to form compounded PVCs useful for forming extrusion or molded components used in exterior environments. In addition to heat and UV stabilizers, other compounding ingredients can include fillers, pigments and colorants, processing lubricants, impact modifiers, other processing aids, as well as other additives if desired, such as biocides and flame retardants.

Fillers ordinarily are used to reduce cost and gloss and can include conventional calcium carbonates derived from limestone or marble but ordinarily will not be used in this invention with the essentially pure calcium carbonate. Other fillers include clay, talc, mica, and diatomaceous earth fillers.

Useful pigments and colorants can be organic, but preferably inorganic mineral, such as titanium dioxide for opacity and UV absorption.

Processing lubricants can be external lubricants to reduce sticking to hot processing metal surfaces and can include low molecular weight polyethylene, paraffin oils, and paraffin waxes. Internal lubricants increase flow of resin particles within the resin melt and can include metal stearates such as stearic acid.

Impact modifiers are useful in rigid PVCs to increase toughness and can include chlorinated polyethylenes, ABS polybutadiene, acrylic or methacylic polymers or copolymers, or butadiene-styrene (MBS).

Other processing aids for extruding rigid PVCs in complex profiles include acrylic or styrene-acrylonitrile copolymers to prevent edge tear in the extrusion of complex profiles.

Processing of Poly(vinyl chloride) Compounds

In compounding the rigid PVCs, the PVC resin is mixed with the various other compounding ingredients in low shear mixers such as a paddle or ribbon blender, although high shear mixers ordinarily are preferred. Useful mixers include a Ross Planetary mixer, a Henschel mixer, Hobart mixers, Banbury mixer, and a Henshel mixer and ribbon blender. In high speed mixing, heat is typically generated while mixing.

The compounded PVCs are then cooled to avoid thermal degradation and thereafter can be stored for later use. Compounded rigid PVCs typically are extruded to form pellets or other solid particles useful in molding or extruding operations to produce rigid plastic components, such as sheets for roofing and wall panels, cladding, house siding, window frames, linear trim and similar exterior uses. Similarly, rigid PVC can be extruded or molded as cap stock fused or otherwise adhered to substrate plastics other than rigid PVC. Co-extruded or laminated cap stock can be prepared as shown in U.S. Pat. No. 4,100,325 to form a composite layer or laminated plastic article. Co-extrusion comprises extrusion of two or more polymeric layers simultaneously brought together into contact at a point prior to extrusion through a shape forming co-extrusion die such as shown in U.S. Pat. No. 3,476,627.

Test Methods

An important accelerated test for measuring resistance to heat, sunlight, and UV radiation, and particularly measuring color changes due to the accelerated exposures, is the QUV weather tester manufactured by Q-Panel Company, which uses UV-B lamps with an energy peak at 313 mm. The QUV accelerated weathering cycle is about 20 hours of light exposure at 50° C., followed by about 4 hours darkness with condensation at 40° C. Color changes are measured by delta E calculated by the Friele-McAdams-Chickering equations as found in *Journal of the Optical Society of America,* 58, 290 (1960) authored by G. Wyszeck.

The merits of the invention are further illustrated by the following examples.

EXAMPLES 1 TO 14

The following raw materials were compounded into rigid PVC resin to form experimental compositions Examples 1-14 at a constant weight parts level indicated in Table 3.

TABLE 3

| COMPONENT | MATERIAL DESCRIPTION | WEIGHT PARTS |
|---|---|---|
| a. SE 950 EG | PVC of 0.9 inherent viscosity | 100 |
| b. T-31 (S008) | Dibutyl tin ethyl hexyl mercaptoacetate | 1 |
| c. Baerostab L230 | Zinc octoate | 0.5 |
| d. Calcium stearate | Calcium stearate | 1.25 |
| e. Loxiol G33 | Mixture ester fatty acids/alcohols | 0.25 |
| f. Paraffin 165F | Paraffin wax | 0.65 |
| g. EBS wax powder | Ethylene bis-steramide | 0.5 |
| h. Paraloid K120N | Methacrylate processing aid | 1 |
| i. Kronos 2160 | $TiO_2$ durable grade | 10 |
| j. Paraloid K175 | Acrylic lubricant processing aid | 1 |
| k. Filler | $CaCO_3$ indicated in Table 4 | Variable |

Using the above components as a basic mixture for all experimental samples compounded, variable filler additives indicated in the Table 4 below were added to form individual compositions for Examples 1 to 14 inclusive below. Fillers A-C qualify as essentially pure calcium carbonates; Fillers D-F do not. Filler D is an example of a known European chalk that is not known to meet the definition of "essentially pure" because of its discoloration due to impurities. Filler E is an example of conventional calcium carbonate used in North America. Filler F is an example of undesired precipitated calcium carbonate where the chemical precipitation process has destroyed the naturally occurring morphology of essentially pure Fillers A-C.

TABLE 4

| | Filler Information | | | | | |
|---|---|---|---|---|---|---|
| | Brand Name | | | | | |
| | A. Optifil T | B. Optifil 100T | C. Optifil JS (W1T) | D. Omyalite | E. Camel Cal ST | F. Polar 81xxC |
| Ore Type | Chalk | Chalk | Chalk | Chalk | Limestone | Chalk |
| Country Origin | Jamaica | Jamaica | Jamaica | France | USA | Jamaica |
| Mfg. Process | Dry | Dry | Wet | Wet | Wet | Precipit. |
| Dry Y brightness | 93 | 93.9 | | | 96 | |
| Mean particle size (μm) | 1.5 | 1.3 | 1.2 | | 0.7 | |
| % less than 2 μm | 50% | | | | | |
| % less than 1 micron | 19% | | | | | |
| Coating Level | 1% | 1% | 1% | | 1% | |
| Coating Type | Stearic | Stearic | Stearic | | Stearic | |

TABLE 4-continued

Filler Information

| | Brand Name | | | | | |
|---|---|---|---|---|---|---|
| | A. Optifil T | B. Optifil 100T | C. Optifil JS (W1T) | D. Omyalite | E. Camel Cal ST | F. Polar 81xxC |
| % CaCO₃ | 99% | 99.2% | 99.3% | | 90% | |
| % MgCO₃ | 0.4% | 0.3% | 0.3% | | | |
| % SiO₂ | 0.1% | 0.02% | 0.02% | | 0.15% | |

Compounding Compositions 1 to 14

Test panels of about 0.178 cm thickness by 8.89 cm wide were extruded for QUV accelerated testing purposes and exposed to QUV testing as follows. The various compounds appear in Table 5.

QUV Weathering

QUV accelerated testing was under UVA 340 lamp, 50° C., with 4 hours condensation. Measurements are in Hunter Delta B and are displayed in Table 6.

Comparative example formulations and results are shaded in gray in Tables 5 and 6 for ease of reading.

ing to the selection and use essentially pure calcium carbonate of the present invention.

EXAMPLE 15

The following example illustrates the use of Caribbean carbonate in PVC material according to this invention using "Natural" rigid PVC as capstock material for a substrate material comprising 50/50 weight blend of rigid PVC and acrylic copolymer blend.

TABLE 5

| Filler | EX1 | EX2 | EX3 | EX4 | EX5 | EX6 | EX7 | EX8 | EX9 | EX10 | EX11 | EX12 | EX13 | EX14 |
|---|---|---|---|---|---|---|---|---|---|---|---|---|---|---|
| A | 12 | | | 6 | | | | | | | | | | |
| B | | | | | 12 | 6 | | | | | | | | |
| C | | | | | | | 12 | 6 | | | | | | |
| D | | | | | | | | | 12 | 6 | | | | |
| E | | | | | | | | | | | 12 | 6 | | |
| F (8102C) | | 12 | | | | | | | | | | | | |
| F (8103C) | | | 12 | | | | | | | | | | | |
| F (8101C) | | | | | | | | | | | | | 12 | 6 |

TABLE 6

| | EX1 | EX2 | EX3 | EX4 | EX5 | EX6 | EX7 | EX8 | EX9 | EX10 | EX11 | EX12 | EX13 | EX14 |
|---|---|---|---|---|---|---|---|---|---|---|---|---|---|---|
| 350 HRS | −0.32 | 0.08 | 0.02 | −0.06 | −0.43 | −0.42 | −0.61 | −0.34 | 0.17 | −0.13 | −0.15 | −0.12 | 0.53 | 0.33 |
| 700 HRS | −0.19 | 0.32 | 0.47 | 0.23 | −0.34 | −0.19 | −0.56 | −0.03 | 0.37 | 0.6 | 0.96 | 1.35 | | |
| 1,050 HRS | 0.5 | 1.18 | 1.29 | 1.82 | 0.74 | 1 | −0.38 | 0.24 | 1.09 | 1.17 | 2.16 | 2.6 | | |
| 1,500 HRS | 2.05 | 2.72 | 3.98 | 3.37 | 0.83 | 2.01 | 0.07 | 0.66 | 1.63 | 2.18 | 1.65 | 2.24 | | |
| 2000 HRS | 2.57 | | | 3.18 | 2.04 | 3.02 | 2.29 | 2.65 | 1.26 | 2.57 | 1.01 | 1.75 | | |

At the 1,050 hour interval, Examples 1, 5 and 7 (Fillers A-C at 12 parts) had out-performed comparative Examples 2, 3, 9, and 11 (Fillers D-F at 12 parts). Example 13 was abandoned as obviously inferior at the 350 hour interval.

At the 1,050 hour interval, Examples 4, 6, and 8 (Fillers A-C at 6 parts) had mostly out-performed comparative Examples 10 and 12 (Fillers D and E at 6 parts). Example 14 was abandoned as obviously inferior at the 350 hour interval.

As the interval increased to 1,500 hours, Examples 5 and 7 (Fillers B and C) showed maintained superiority over comparative Examples 9 and 11. But by 2,000 hours, the weathering data for comparative Examples had exceeded the Examples of the present invention.

Nonetheless, a sample of the Examples has been shown to endure at least 3 years of uninterrupted exposure to the climate of the Southwestern United States. The sample was located in an Arizona testing facility. Its Hunter Delta B after three years indicated superior weathering resistance accord-

TABLE 7

| "Natural" capstock | Weight |
|---|---|
| SE 950 EG | 100 |
| T-31 | 1 |
| Baerostab L230 | 0.5 |
| Calcium stearate | 1.25 |
| Loxiol G33 | 0.25 |
| Paraffin 165 F | 0.65 |
| EBS wax powder | 0.5 |
| Paraloid K 120 N | 1 |
| Paraloid KM 334 | 9 |
| Paraloid K 175 | 1 |
| Optifil T | 12 |

QUV weathering WVA 340 lamp, 50° C. for 4 hours was as follows.

TABLE 8

|  | Natural PVC/Acrylic Alloy | "Natural" PVC (Non-Alloy) |
| --- | --- | --- |
| Hunter Delta B |  |  |
| 500 hours | −0.73 | 1.03 |
| 1000 hours | −0.44 | 7.04 |
| 1500 hours | −1.23 | 10.7 |
| 2000 hours | −0.84 | 12.2 |
| Hunter Delta E |  |  |
| 500 hours | 1.02 | 9.11 |
| 1000 hours | 2.91 | 15.26 |
| 1500 hours | 1.59 | 23.08 |
| 2000 hours | 1.05 | 21.91 |

This example shows that the alloy performed better than the non-alloy.

EXAMPLE 16

The following compounds are 50/50 PVC/acrylic alloys compounded with various color pigments. Commercial Descriptions in Table 9; Compounding materials are shown by weight parts in Table 10; and QUV Weathering in Table 11.

TABLE 9

| Material | Chemical Description |
| --- | --- |
| Shintech SE960EG | PVC with inherent viscosity of 0.9 |
| Acrylicgard CS-102 | Acrylic capstock (Rohm & Haas) |
| Thermolite T31 | Dibutyl tin athyl hexyl mercaptoacetate |
| Baerostab L120 | Zinc octoate |
| Witco F | Calcium Stearate |
| Loxiol G33 | Mixture of fatty acids/alcohols |
| Parafin 165F | Paraffin wax |
| Kemamide | EBS wax |
| Paraloid K 175 | Acrylic lubricant processing aid |
| Paraloid KM 334 | Acrylic impact modifier |
| Metablen P 550 | Acrylic processing aid |
| Optifil JS | Jamaican calcium carbonate |
| Yellow V-9118 | Yellow Pigment |
| BLK V-700 | Black Pigment |
| Sun green 264-0414 | Green Pigment |
| Tiona RCL-6 | Titanium dioxide pigment |
| Brown 9186 | Brown Pigment |
| Blue BCS | Blue Pigment |
| Violet 246-0505 | Violet Pigment |

TABLE 10

| Material | Clay | Blue | Natural base | Green |
| --- | --- | --- | --- | --- |
| Shintech SE960EG | 50 | 50 | 50 | 50 |
| Acrylicgard CS-102 | 63.58 | 63.58 | 63.58 | 63.58 |
| Thermolite T31 | 0.5 | 0.5 | 0.5 | 0.5 |
| Baerostab L230 | 0.25 | 0.25 | 0.25 | 0.25 |
| Witco F | 0.625 | 0.625 | 0.625 | 0.625 |
| Loxiol G33 | 0.125 | 0.125 | 0.125 | 0.125 |
| Paraffin 165F | 0.325 | 0.325 | 0.325 | 0.325 |
| Kemamide W40 | 0.25 | 0.25 | 0.25 | 0.25 |
| Paraloid K175 | 0.5 | 0.5 | 0.5 | 0.5 |
| Paraloid KM 334 | 4.5 | 4.5 | 4.5 | 4.5 |
| Metablen P550 | 0.5 | 0.5 | 0.5 | 0.5 |
| Optifil JS | 6 | 6 | 6 | 6 |
| Yellow V-9118 | 0.477 | 0 | 0 | 0.127 |
| BLK V-700 | 0.54 | 1.748 | 0 | 1.081 |
| Sun green 264-0414 | 0 | 0 | 0 | 0 |
| Tiona RCL-6 | 3.65 | 3.973 | 0 | 0.127 |
| Brown 9186 | 0.318 | 0 | 0 | 0 |
| Blue BCS | 0 | 0.095 | 0 | 0 |
| Violet 246-0505 | 0 | 0.0064 | 0 | 0 |

TABLE 11

| QUV WEATHERING | Clay | Blue | Natural | Green |
| --- | --- | --- | --- | --- |
| Initial color |  |  |  |  |
| L | 62.73 | 47.43 |  | 32.21 |
| a | 0.93 | −2.44 |  | −8.78 |
| b | 7.96 | −11.27 |  | −0.24 |
| Measuring Time | 350 hours | 350 hours | 500 hours | 350 hours |
| Delta E | 0.29 | 0.21 | 1.02 | 0.16 |
| Delta L | −0.09 | 0.15 | 0.24 | 0.12 |
| Delta a | 0.11 | −0.12 | 0.66 | 0.02 |
| Delta b | −0.25 | −0.08 | −.073 | −0.11 |
| Measuring Time | 1000 hours | 1000 hours |  | 1000 hours |
| Delta E | 0.45 | 0.34 |  | 0.79 |
| Delta L | −0.39 | −0.15 |  | −0.77 |
| Delta a | 0.13 | −0.3 |  | 0.01 |
| Delta b | −0.18 | −0.01 |  | 0.01 |

TABLE 11-continued

| | Measuring Time | | | |
|---|---|---|---|---|
| | 1050 hours | 1050 hours | 1050 hours | 1050 hours |
| Delta E | 0.4 | 0.34 | 2.91 | 1 |
| Delta L | −0.34 | −0.17 | 1.5 | −096 |
| Delta a | 0.12 | −0.3 | 2.45 | −0.26 |
| Delta b | −0.18 | 0.01 | −0.44 | −0.05 |

| | Measuring Time | | | |
|---|---|---|---|---|
| | 1500 hours | 1500 hours | 1500 hours | 1500 hours |
| Delta E | 0.5 | 0.47 | 1.59 | 1.01 |
| Delta L | −0.46 | −0.26 | −0.38 | −0.95 |
| Delta a | −0.13 | −0.4 | 0.93 | −0.31 |
| Delta b | −0.16 | 0.03 | −1.23 | −0.15 |

| | Measuring Time | | | |
|---|---|---|---|---|
| | 2000 hours | 2000 hours | 2000 hours | 2000 hours |
| Delta E | 0.62 | 0.55 | 1.05 | 2.03 |
| Delta L | −0.58 | −0.24 | −0.07 | −1.97 |
| Delta a | 0.15 | −0.49 | 0.63 | −0.39 |
| Delta b | −0.17 | 0.02 | −0.84 | −0.29 |

Table 11 shows that excellent weathering of natural and pigmented PVC compounds are obtained using Jamaican calcium carbonate according to the present invention.

The invention is not limited to the above examples. The claims follow.

What is claimed is:

1. A weather resistant poly(vinyl chloride) compound, comprising:
   (a) poly(vinyl chloride) and
   (b) at least 2 weight parts of essentially pure calcium carbonate per 100 weight parts of poly(vinyl chloride), the calcium carbonate having a particle size less than 10 μm, wherein the essentially pure calcium carbonate has a purity of at least 95 weight percent and serves as a light stabilizer by scavenging for free hydrochloric acid generated in poly(vinyl chloride) upon exposure to visible and ultraviolet light.

2. The compound of claim 1, wherein the essentially pure calcium carbonate particle size is less than 6 μm.

3. The compound of claim 1, wherein the calcium carbonate is Jamaican calcium carbonate.

4. The compound of claim 1, wherein the essentially pure calcium carbonate is present in an amount from about 2 to about 50 weight parts.

5. The compound of claim 1, wherein the essentially pure calcium carbonate particles are surface treated with a stearate.

6. The compound of claim 1, further comprising:
   (c) at least 0.5 weight parts of organotin heat stabilizer based on 100 weight parts of poly(vinyl chloride), wherein the organotin stabilizer comprises substituted mono-alkyl or dialkyl or trialkyl esters of tin with mono-, di-, or tri-substituted active mercapto groups or carboxylate groups.

7. The compound of claim 6, further comprising:
   (d) at least 0.1 weight parts of zinc dialkyl ester scavenger per 100 weight parts of PVC resin, provided the equivalents of active mercapto groups or carboxylate groups in the organotin are equal to or exceed the equivalents of dialkyl ester groups in the zinc dialkyl ester.

8. The compound of claim 1, wherein the poly(vinyl chloride) comprises is a homopolymer or a copolymer of copolymerized vinyl chloride monomer with less than 5% by weight copolymerized other unsaturated co-monomer.

9. A compound comprising a mixture of polymers, wherein one polymer is the compound of claim 1 and wherein a second polymer is a poly(acrylic) polymer.

10. The compound of claim 9, wherein the poly(acrylic) polymer is a poly(meth)acrylate present in the mixture in an amount from about 25 to about 75 weight percent of the mixture.

11. A process for producing a poly(vinyl chloride) compound, the process comprising:
   (a) providing an essentially pure calcium carbonate having a particle size less than 10 μm; and
   (b) mixing the calcium carbonate with poly(vinyl chloride) in an amount of at least 2 weight parts calcium carbonate per 100 weight parts of poly(vinyl chloride), wherein the essentially pure calcium carbonate has a purity of at least 95 weight percent and serves as a light stabilizer by scavenger for free hydrochloric acid generated in poly(vinyl chloride) upon exposure to visible and ultraviolet light.

12. A poly(vinyl chloride) article comprising the compound of claim 1.

13. The article of claim 12, wherein the essentially pure calcium carbonate particle size is less than 6 μm.

14. The article of claim 12, wherein the calcium carbonate is Jamaican calcium carbonate.

15. The article of claim 12, wherein the essentially pure calcium carbonate is present in an amount from about 2 to about 50 weight parts and is surface treated with a stearate.

16. The article of claim 12, wherein the compound further comprises:
   (c) at least 0.5 weight parts of organotin heat stabilizer based on 100 weight parts of poly(vinyl chloride), wherein the organotin stabilizer comprises substituted mono-alkyl or dialkyl or trialkyl esters of tin with mono-, di-, or tri-substituted active mercapto groups or carboxylate groups.

17. The article of claim 16, wherein the compound further comprises:
(d) at least 0.1 weight parts of zinc dialkyl ester scavenger per 100 weight parts of PVC resin, provided the equivalents of active mercapto groups or carboxylate groups in the organotin are equal to or exceed the equivalents of dialkyl ester groups in the zinc dialkyl ester.

18. The article of claim 12, wherein the poly(vinyl chloride) comprises is a homopolymer or a copolymer of copolymerized vinyl chloride monomer with less than 5% by weight copolymerized other unsaturated co-monomer.

19. The article of claim 12, where the compound comprises a mixture of polymers, wherein one polymer is the compound of claim 1 and wherein a second polymer is a poly(acrylic) polymer.

20. The article of claim 12, wherein the compound comprises a mixture of polymers, wherein one polymer is the compound of claim 7 and wherein a second polymer is a poly(acrylic) polymer.

* * * * *